US012602060B2

(12) United States Patent
Jiang et al.

(10) Patent No.: US 12,602,060 B2
(45) Date of Patent: Apr. 14, 2026

(54) INTELLIGENT OBSTACLE DETECTION SYSTEM FOR UNMANNED MINE VEHICLE

(71) Applicant: Xi'an University of Architecture and Technology, Xi'an (CN)

(72) Inventors: Song Jiang, Xi'an (CN); Binjian Rao, Xi'an (CN); Ruonan Kong, Xi'an (CN); Zhixiang Cui, Xi'an (CN); Runfeng He, Xi'an (CN); Qinghua Gu, Xi'an (CN); Xiaoshuang Li, Xi'an (CN); Shunling Ruan, Xi'an (CN); Yi Tan, Xi'an (CN); Sai Zhang, Xi'an (CN); Di Liu, Xi'an (CN); Xiaohua Ding, Xi'an (CN); Li Guo, Xi'an (CN); Zhigang Tao, Xi'an (CN); Yong Hong, Xi'an (CN); Dong Duan, Xi'an (CN); Ying Chen, Xi'an (CN); Ming Ji, Xi'an (CN); Lianjing Ma, Xi'an (CN); Na Zhang, Xi'an (CN); Shibin Tang, Xi'an (CN); Caiwu Lu, Xi'an (CN); Xiaochuan Xu, Xi'an (CN); Huiwen He, Xi'an (CN); Zhengxiang He, Xi'an (CN)

(73) Assignee: Xi'an University of Architecture and Technology, Xi'an (CN)

( * ) Notice: Subject to any disclaimer, the term of this patent is extended or adjusted under 35 U.S.C. 154(b) by 21 days.

(21) Appl. No.: 18/748,107

(22) Filed: Jun. 20, 2024

(65) Prior Publication Data

US 2025/0004478 A1     Jan. 2, 2025

(30) Foreign Application Priority Data

Jun. 30, 2023     (CN) ......................... 202310789768.0

(51) Int. Cl.
*G05D 1/622* (2024.01)
*G01S 17/89* (2020.01)
(Continued)

(52) U.S. Cl.
CPC .............. *G05D 1/622* (2024.01); *G01S 17/89* (2013.01); *G01S 17/931* (2020.01); *G05D 1/86* (2024.01);
(Continued)

(58) Field of Classification Search
CPC ...... G05D 1/622; G05D 1/86; G05D 2105/05; G05D 2107/73; G05D 2111/30;
(Continued)

(56) References Cited

U.S. PATENT DOCUMENTS

2022/0244140 A1* 8/2022 Han ...................... F02D 31/007
2023/0059996 A1* 2/2023 Makela ................... E21F 13/00

FOREIGN PATENT DOCUMENTS

CN          106650298 A  *  5/2017   ............. G16Z 99/00
CN          110375736 A  *  10/2019  ............. G01C 21/20
(Continued)

OTHER PUBLICATIONS

Machine translation of CN-113610280-A (Year: 2025).*
(Continued)

*Primary Examiner* — Jennifer M Anda

(57)          ABSTRACT

An intelligent obstacle detection system for an unmanned mine vehicle is provided to solve the problem of existing intelligent obstacle detection systems for unmanned mine vehicles cannot compare and analyze the actual driving data with the preset data and includes an intelligent detection platform, a route planning device, an obstacle detection device, a planning management device, an operation monitoring device, and a storage device. The route planning device is configured to perform route planning analysis for
(Continued)

Step 1: performing route planning analysis for the unmanned mine vehicle, obtaining the starting position and the target position of the unmanned mine vehicle, obtaining travel routes from the starting position and the target position, collecting point cloud data of the travel routes through detection terminals, and generating the point cloud data Step 2: detecting and analyzing the obstacle in the planned route of the unmanned mine vehicle; detecting the size of the obstacle through the plurality of millimeter radars disposed in the front of the unmanned mine vehicle in response to the obstacle having been detected, and controlling the unmanned mine vehicle to avoid the obstacle in response to the size of the obstacle failing to meet requirements Step 3: analyzing and managing the planned route of the unmanned mine vehicle; marking the unmanned mine vehicle with the starting position, which is the same as the target position, as the management object, marking the travel processes of the management object on the planned route as the management processes, obtaining the overlap coefficient and the deviation coefficient of the management processes, obtaining the overlap threshold and the deviation threshold of the management processes from the storage device to determine whether the planned route of the unmanned mine vehicle meets the requirements Step 4: monitoring and analyzing the driving status of the unmanned mine vehicle on the planned route; obtaining the vibration frequency data ZP, the amplitude data ZF and the noise data ZS of the unmanned mine vehicle driving on the planned route; obtaining the operation coefficient YX by the numerical calculation of the vibration frequency data ZP, the amplitude data ZF, and the noise data ZS, and determining whether the driving status of the unmanned mine vehicle on the planned route meets requirements through the operating coefficient YX the unmanned mine vehicle to obtain a planned route of the unmanned mine vehicle. The planned route is sent to the obstacle detection device. The intelligent obstacle detection system can plan and analyze the travel route. By locking onto starting and target positions of the unmanned mine vehicles, and then obtaining point cloud data through the detection terminals and calculating with algorithms, the optimal planned route can be determined.

5 Claims, 2 Drawing Sheets

(51) Int. Cl.

| | |
|---|---|
| *G01S 17/931* | (2020.01) |
| *G05D 1/86* | (2024.01) |
| *G06T 7/70* | (2017.01) |
| G05D 105/05 | (2024.01) |
| G05D 107/70 | (2024.01) |
| G05D 111/30 | (2024.01) |

(52) U.S. Cl.
CPC ........... *G06T 7/70* (2017.01); *G05D 2105/05* (2024.01); *G05D 2107/73* (2024.01); *G05D*

*2111/30* (2024.01); *G06T 2207/10028* (2013.01); *G06T 2207/30261* (2013.01)

(58) Field of Classification Search
CPC .. G05D 1/2424; G05D 2109/10; G01S 17/89; G01S 17/931; G06T 7/70; G06T 2207/10028; G06T 2207/30261
See application file for complete search history.

(56) References Cited

FOREIGN PATENT DOCUMENTS

| | | | | | |
|---|---|---|---|---|---|
| CN | 113610280 A | * | 11/2021 | ........... | G06Q 10/047 |
| CN | 116238545 A | * | 6/2023 | ........... | B60W 60/00 |

OTHER PUBLICATIONS

Machine translation of CN-116238545-A (Year: 2025).*
Machine translation of CN-106650298-A (Year: 2025).*
Machine translation of CN-110375736-A (Year: 2025).*

* cited by examiner

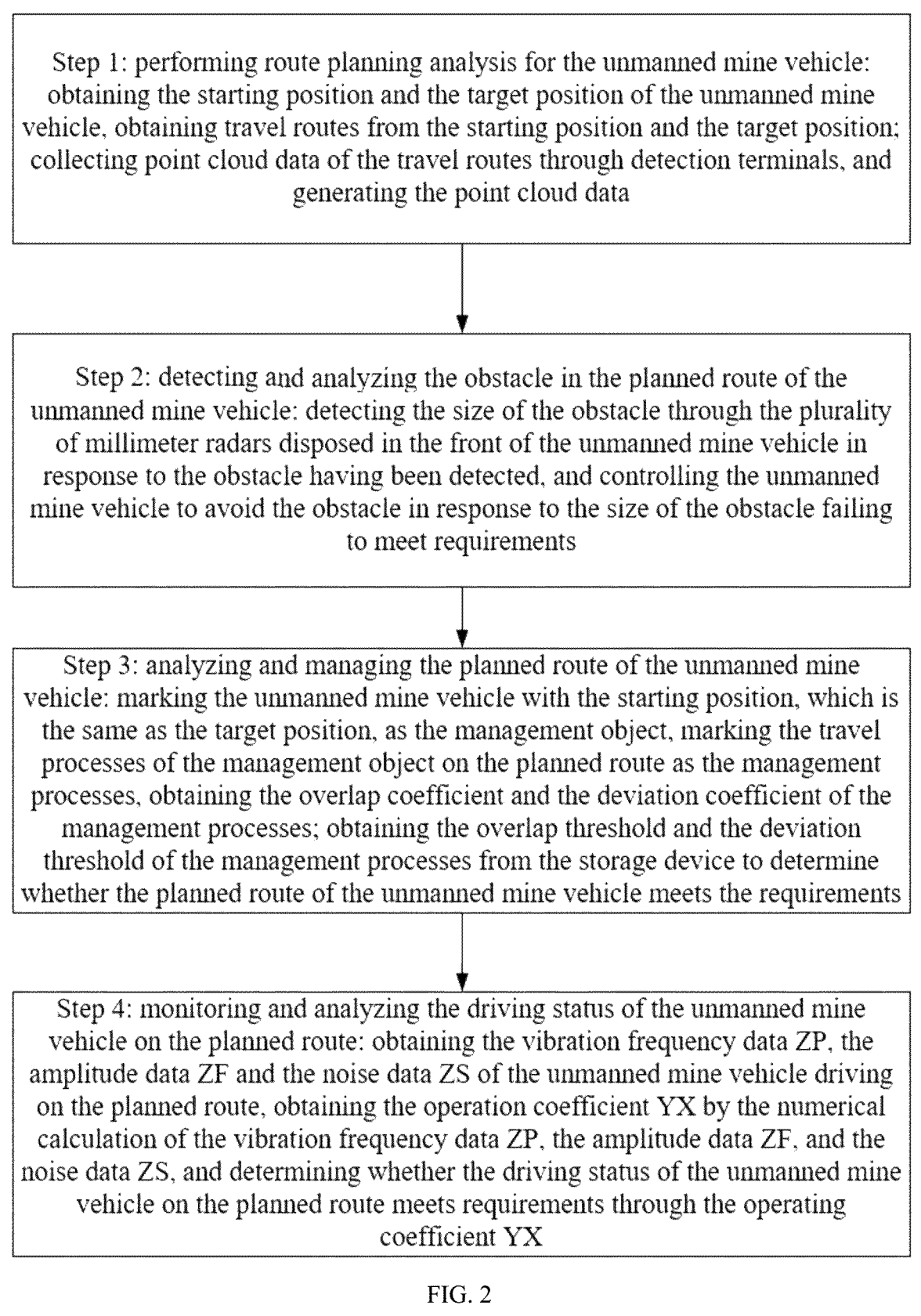

Step 1: performing route planning analysis for the unmanned mine vehicle: obtaining the starting position and the target position of the unmanned mine vehicle, obtaining travel routes from the starting position and the target position; collecting point cloud data of the travel routes through detection terminals, and generating the point cloud data Step 2: detecting and analyzing the obstacle in the planned route of the unmanned mine vehicle: detecting the size of the obstacle through the plurality of millimeter radars disposed in the front of the unmanned mine vehicle in response to the obstacle having been detected, and controlling the unmanned mine vehicle to avoid the obstacle in response to the size of the obstacle failing to meet requirements Step 3: analyzing and managing the planned route of the unmanned mine vehicle: marking the unmanned mine vehicle with the starting position, which is the same as the target position, as the management object, marking the travel processes of the management object on the planned route as the management processes, obtaining the overlap coefficient and the deviation coefficient of the management processes; obtaining the overlap threshold and the deviation threshold of the management processes from the storage device to determine whether the planned route of the unmanned mine vehicle meets the requirements Step 4: monitoring and analyzing the driving status of the unmanned mine vehicle on the planned route: obtaining the vibration frequency data ZP, the amplitude data ZF and the noise data ZS of the unmanned mine vehicle driving on the planned route, obtaining the operation coefficient YX by the numerical calculation of the vibration frequency data ZP, the amplitude data ZF, and the noise data ZS, and determining whether the driving status of the unmanned mine vehicle on the planned route meets requirements through the operating coefficient YX

FIG. 2

INTELLIGENT OBSTACLE DETECTION SYSTEM FOR UNMANNED MINE VEHICLE

TECHNICAL FIELD

The disclosure relates to the technical field of obstacle recognition and data analysis, and particularly to an intelligent obstacle detection system for an unmanned mine vehicle.

BACKGROUND

Currently, unmanned driving technology has been applied to the mining industry. The use of unmanned mine vehicles can save human resources and also prevent drivers from working in poor environments such as mines. Wireless communication technology is commonly used for communication with the unmanned mine vehicles.

Existing intelligent obstacle detection systems for unmanned mine vehicles typically assign a preset route to the unmanned mine vehicles before operation, and then optimize the preset route based on real-time obstacle detection results during the driving process to ensure the safety of the unmanned mine vehicles. However, this method cannot compare and analyze actual driving data of the vehicles with preset data, and thus cannot adjust the preset route and real-time detection parameters, thereby resulting in certain safety hazards when the unmanned mine vehicles are driving.

To solve the above problem, an intelligent obstacle detection system for an unmanned mine vehicle is provided.

SUMMARY

The disclosure provides an intelligent obstacle detection system for an unmanned mine vehicle, which is to solve the problem of existing intelligent obstacle detection systems for unmanned mine vehicles cannot compare and analyze the actual driving data with the preset data.

The intelligent obstacle detection system for an unmanned mine vehicle is provided to solve the technical problem as follows: how to provide an intelligent obstacle detection system for an unmanned mine vehicle that can compare and analyze actual driving data with preset data.

The purpose of the disclosure can be achieved through the following technical solutions.

An intelligent obstacle detection system for an unmanned mine vehicle includes an intelligent detection platform, a route planning device, an obstacle detection device, a planning management device, an operation monitoring device, and a storage device.

The route planning device is configured to perform route planning analysis for the unmanned mine vehicle to obtain a planned route of the unmanned mine vehicle, and send the planned route of the unmanned mine vehicle to the obstacle detection device through the detection platform.

The obstacle detection device includes multiple millimeter radars and is configured to detect and analyze an obstacle in the planned route, and specifically, the obstacle detection device is configured to control the unmanned mine vehicle to move along the planned route; perform, through multiple millimeter radars disposed in a front of the unmanned mine vehicle, a real-time obstacle analysis during the movement of the unmanned mine vehicle, to obtain a size of the obstacle in response to the obstacle having been detected, and in response to the size of the obstacle failing to meet requirements, control the unmanned mine vehicle to avoid the obstacle until the unmanned mine vehicle arrives a target position.

The planning management device is configured to analyze and manage the planned route of the unmanned mine vehicle, and specifically, the planning management device is configured to mark the unmanned mine vehicle with a starting position, which is the same as the target position, as a management object; mark travel processes of the management object on the planned route as management processes; obtain an overlap coefficient and a deviation coefficient of the management processes; obtain an overlap threshold and a deviation threshold of the management processes from the storage device; compare the overlap coefficient and the deviation coefficient with the overlap threshold and the deviation threshold respectively to obtain comparison results; and determine, based on the comparison results, whether the planned route of the unmanned mine vehicle meets requirements.

The operation monitoring device is configured to monitor and analyze a driving status of the unmanned mine vehicle on the planned route.

In an embodiment, the route planning device is specifically configured to: obtain the starting position and the target position of the unmanned mine vehicle, obtain travel routes from the starting position to the target position, collect point cloud data of the travel routes from detection terminals including lidars and cameras, perform algorithmic analysis on the point cloud data to determine a number of obstacles on each of the travel routes and mark the number of obstacles as ZA, mark a length of each of the travel routes as a distance value LC, calculate a planning coefficient GH of each of the travel routes by a numerical computation of ZA and LC; and mark a corresponding one of the travel routes with a smallest GH as the planned route.

In an embodiment, a step of determining whether the size of the obstacle meets requirements includes: comparing the size of the obstacle with a preset size threshold; in response to the size of the obstacle being smaller than the preset size threshold, determining that the size of the obstacle meets requirements; or in response to the size of the obstacle being greater than or equal to the preset size threshold, determining that the size of the obstacle fails to meet requirements.

In an embodiment, a step of obtaining the overlap coefficient and the deviation coefficient of the management processes includes: obtaining an overlap degree between each of the travel routes of the management object during the management processes and the planned route to thereby obtain overlap degrees of the management processes, and marking the overlap degrees as overlap values of the management processes; summing up the overlap values of the management processes and taking an average to get the overlap coefficient, establishing an overlap set based on the overlap values of the management processes, and calculating a variance of the overlap set to obtain the deviation coefficient.

In an embodiment, a step of comparing the overlap coefficient and the deviation coefficient with the overlap threshold and the deviation threshold respectively to obtain comparison results includes: in response to the overlap coefficient being greater than the overlap threshold, determining that the planned route of the unmanned mine vehicle meets requirements; sending, by the planning management device, a planning qualification signal to the detection platform, to make the detection platform send the planning qualification signal to a mobile terminal of a management personnel upon receiving the planning qualification signal;

or in response to the overlap coefficient being less than or equal to the overlap threshold and the deviation coefficient being greater than the deviation threshold, determining that the planned route of the unmanned mine vehicle fails to meet requirements, and reasons for not meeting requirements are an influence of real-time road conditions, sending, by the planning management device, a road condition management signal to the detection platform, to make the detection platform send the road condition management signal to the mobile terminal of the management personnel upon receiving the road condition management signal; or in response to the overlap coefficient being less than or equal to the overlap threshold and the deviation coefficient being less than or equal to the deviation threshold, determining that the planned route of the unmanned mine vehicle fails to meet requirements, and the reasons for not meeting requirements are an influence of the point cloud data, sending, by the planning management device, sends a point cloud optimization signal to the detection platform, to make the detection platform send the point cloud optimization signal to the mobile terminal of the management personnel upon receiving the point cloud optimization signal.

In an embodiment, the operation monitoring device is specifically configured to: obtain vibration frequency data ZP, amplitude data ZF and noise data ZS of the unmanned mine vehicle driving on the planned route, wherein the vibration frequency data ZP represents a maximum vibration frequency of the unmanned mine vehicle driving on the planned route, the amplitude data ZF represents a maximum vibration amplitude of the unmanned mine vehicle driving on the planned route, the noise data ZS represents a maximum noise decibel value of the unmanned mine vehicle driving on the planned route;

obtain an operation coefficient YX of the unmanned mine vehicle driving on the planned route, by numerical calculation of the vibration frequency data ZP, the amplitude data ZF, and the noise data ZS;

obtain an operating threshold YXmax from the storage device;

compare the operating coefficient YX with the operating threshold YXmax to obtain a comparison result, and determine whether the driving status of the unmanned mine vehicle driving on the planned route meets requirements based on the comparison result.

In an embodiment, a step of comparing the operating coefficient YX with the operating threshold YXmax includes: in response to the operating coefficient YX being less than the operating threshold YXmax, determining that the driving status of the unmanned mine vehicle driving on the planned route meets requirements; or in response to the operating coefficient YX being greater than or equal to the operating threshold YXmax, determining that the driving status of the unmanned mine vehicle on the planned route fails to meet requirements; marking the preset size threshold as CC, and obtaining a new size threshold CCn for updating the preset size threshold CC by using the formula as follows:

$$CCn = t1 \times CC,$$

where t1 is a proportional coefficient and $0.85 \leq t1 \leq 0.95$. The new size threshold CCn is taken to replace a numerical value of the preset size threshold CC in the obstacle detection device.

In an embodiment, a working method of the intelligent obstacle detection system for the unmanned mine vehicle includes steps as follows.

Step 1: performing route planning analysis for the unmanned mine vehicle: obtaining the starting position and the target position of the unmanned mine vehicle, obtaining travel routes from the starting position and the target position; collecting point cloud data of the travel routes through detection terminals, and generating the point cloud data.

Step 2: detecting and analyzing the obstacle in the planned route of the unmanned mine vehicle: detecting the size of the obstacle through the multiple millimeter radars disposed in the front of the unmanned mine vehicle in response to the obstacle having been detected, and controlling the unmanned mine vehicle to avoid the obstacle in response to the size of the obstacle failing to meet requirements.

Step 3: analyzing and managing the planned route of the unmanned mine vehicle: marking the unmanned mine vehicle with the starting position, which is the same as the target position, as the management object, marking the travel processes of the management object on the planned route as the management processes, obtaining the overlap coefficient and the deviation coefficient of the management processes; obtaining the overlap threshold and the deviation threshold of the management processes from the storage device to determine whether the planned route of the unmanned mine vehicle meets the requirements.

Step 4: monitoring and analyzing the driving status of the unmanned mine vehicle on the planned route: obtaining the vibration frequency data ZP, the amplitude data ZF and the noise data ZS of the unmanned mine vehicle driving on the planned route, obtaining the operation coefficient YX by the numerical calculation of the vibration frequency data ZP, the amplitude data ZF, and the noise data ZS, and determining whether the driving status of the unmanned mine vehicle on the planned route meets requirements through the operating coefficient YX.

The benefits of the disclosure are as follows.

1. Through the route planning device, the travel route of the unmanned mine vehicle can be planned and analyzed. By locking onto the starting position and the target position of the unmanned mine vehicle, and then obtaining point cloud data through the detection terminals and calculating with algorithms to obtain the optimal planned route, this ensures the driving efficiency and safety of the unmanned mine vehicle on the planned route.

2. Through the obstacle detection device, real-time detection and analysis of the obstacles on the planned route of the unmanned mine vehicle can be conducted. By using millimeter radars to detect the obstacles during the driving processes and determining whether the mine vehicle can pass normally based on the sizes of the obstacles, fine-tuning of the actual route of the unmanned mine vehicle can be made on the basis of the planned route.

3. Through the planning management device, the planned route of the unmanned mine vehicle can be managed and analyzed. By comprehensively analyzing the overlap between the actual route and the planned route of the managed distance, the overlap coefficient and the deviation coefficient can be obtained. Then, feedback can be provided on parameters such as road conditions and the accuracy of the point cloud data for travels of the unmanned mine vehicle, optimizing the subsequent obstacle analysis results for the unmanned mine vehicle.

4. Through the operation monitoring device, the driving status of the unmanned mine vehicle on the planned route can be monitored and analyzed. By comprehensively analyzing and calculating various parameters of the travels of the unmanned mine vehicle on the planned route to obtain the operation coefficient, the operation coefficient is a numerical value that reflects the stability of the operation of the unmanned mine vehicle. Therefore, the necessity of adjusting the obstacle threshold can be analyzed through the value of the operation coefficient.

In an embodiment, the working method is implemented by a device including a processor and a memory with an application stored therein. The obstacle detection device, the operation monitoring device, and the storage device are processors and memories with specific applications stored therein.

BRIEF DESCRIPTION OF DRAWINGS

In order to provide a clearer explanation of the embodiments of the disclosure or the technical solutions in the related art, a brief introduction will be given below to the attached drawings required in the embodiments or related art description. It is evident that the attached drawings in the following description are only some embodiments of the disclosure. For those skilled in the art, other attached drawings can be obtained based on these drawings without creative labor.

FIG. 2 illustrates a flowchart of an operation method for the intelligent obstacle detection system for the unmanned mine vehicle according to an embodiment 2 of the disclosure.

DETAILED DESCRIPTION OF EMBODIMENTS

Figure 1:
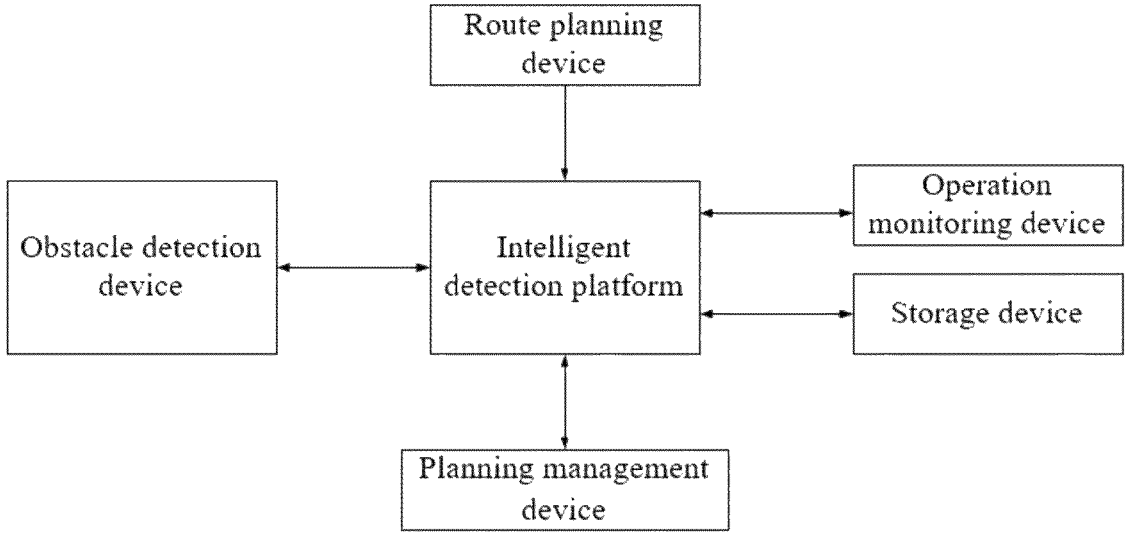
FIG. 1 illustrates a block diagram of an intelligent obstacle detection system for an unmanned mine vehicle according to an embodiment 1 of the disclosure.

The following will provide a clear and complete description of the technical solution of the disclosure in conjunction with the embodiments. Apparently, the described embodiments are only a part of the embodiments of the disclosure, not all of them. Based on the embodiments in the disclosure, all other embodiments obtained by those skilled in the art without creative labor fall within the scope of protection of the disclosure.

Embodiment 1

As shown in FIG. 1, an intelligent obstacle detection system for an unmanned mine vehicle includes an intelligent detection platform, a route planning device, an obstacle detection device, a planning management device, an operation monitoring device, and a storage device.

The route planning device is configured to perform route planning analysis for the unmanned mine vehicle to obtain a planned route of the unmanned mine vehicle. The route planning device is further configured to obtain a starting position and a target position of the unmanned mine vehicle, all travels route from the starting position to the target position are obtained. Point cloud data of the travel route is collected from detection terminals, and the detection terminals include lidars and cameras. The algorithmic analysis is performed on the point cloud data to determine a number of obstacles on each of the travel routes, the number of the obstacles is marked as ZA, and a length of each of the travel routes is marked as a distance value LC. A planning coefficient GH of each of the travel routes is obtained through the formula as follows:

$$GH = \alpha1 \times ZA + \alpha2 \times LC,$$

where $\alpha1$ and $\alpha2$ are proportionality coefficients, and $\alpha1 > \alpha2 > 1$. A corresponding one of the travel routes with a smallest GH is marked as the planned route, the planned route of the unmanned mine vehicle is sent to the obstacle detection device through the detection platform. Through the route planning device, the travel route of the unmanned mine vehicle can be planned and analyzed. By locking onto the starting position and the target position of the unmanned mine vehicle, and then obtaining point cloud data through the detection terminals and calculating with algorithms to obtain the optimal planned route, this ensures the driving efficiency and safety of the unmanned mine vehicle on the planned route.

The obstacle detection device is configured to detect and analyze obstacles in the planned route, and the obstacle detection device is further configured to control the unmanned mine vehicle to move along the planned route, perform, through multiple millimeter radars disposed in a front of the unmanned mine vehicle, a real-time obstacle analysis during the movement of the unmanned mine vehicle, to obtain a size of the obstacle in response to the obstacle having been detected, and in response to the size of the obstacle failing to meet requirements, control the unmanned mine vehicle to avoid the obstacle until the unmanned mine vehicle arrives a target position. A step of determining whether the size of the obstacle meets requirements includes: the sizes of the obstacles are compared with a preset size threshold: in response to the size of the obstacle being smaller than the preset size threshold, determining that the size of the obstacle meets requirements; or in response to the size of the obstacle being greater than or equal to the preset size threshold, determining that the size of the obstacle fails to meet requirements. Through the obstacle detection device, real-time detection and analysis of the obstacles on the planned route of the unmanned mine vehicle can be conducted. By using millimeter radars to detect the obstacles during the driving processes and determining whether the mine vehicle can pass normally based on the sizes of the obstacles, fine-tuning of the actual route of the unmanned mine vehicle can be made on the basis of the planned route.

The planning management device is configured to analyze and manage the planned route of the unmanned mine vehicle. Specifically, the planning management device is configured to mark the unmanned mine vehicle with a starting position, which is the same as the target position, as a management object; mark travel processes of the management object on the planned route as management processes. Overlap degrees between each of the travel routes of the management object during the management processes and the planned route are obtained to thereby obtain overlap degrees of the management processes and the overlap degrees is marked as overlap values of the management processes. All the overlap values of the management processes are summed up and followed by taking an average to get the overlap coefficient. An overlap set is established based on the overlap values of the management processes, and a variance of the overlap set is calculated to obtain the deviation coefficient. A step of comparing the overlap coefficient and the deviation coefficient with the overlap threshold and the deviation threshold respectively to obtain comparison results includes: in response to the overlap coefficient being greater than the overlap threshold, it is determined that the planned route of the unmanned mine vehicle meets the requirements. The planning management device sends a planning qualification signal to the intelligent detection platform, then the intelligent detection platform sends the planning qualification signal to a mobile terminal of a management personnel upon receiving the planning qualification signal. Or in response to the overlap coefficient being less than or equal to the overlap threshold and the deviation coefficient being greater than the deviation threshold, it is determined that the planned route of the unmanned mine vehicle fails to meet requirements meet the requirements, and reasons for not meeting the requirements are the influence of real-time road conditions. The planning management device sends a road condition management signal to the intelligent detection platform, then the intelligent detection platform sends the road condition management signal to the mobile terminal of the management personnel upon receiving the road condition management signal. Or in response to the overlap coefficient being less than or equal to the overlap threshold and the deviation coefficient being less than or equal to the deviation threshold, it is determined that the planned route of the unmanned mine vehicle fails to meet the requirements, and the reasons for not meeting the requirements are an influence of the point cloud data. The planning management device sends a point cloud optimization signal to the intelligent detection platform, then the intelligent detection platform sends the point cloud optimization signal to the mobile terminal of the management personnel upon receiving the point cloud optimization signal. Through the planning management device, the planned route of the unmanned mine vehicle can be managed and analyzed. By comprehensively analyzing the overlap between the actual route and the planned route of the managed distance, the overlap coefficient and the deviation coefficient can be obtained. Then, feedback can be provided on parameters such as road conditions and the accuracy of the point cloud data for travels of the unmanned mine vehicle, optimizing the subsequent obstacle analysis results for the unmanned mine vehicle.

The operation monitoring device is configured to monitor and analyze a driving status of the unmanned mine vehicle on the planned route. The operation monitoring device includes steps as follows. Vibration frequency data ZP, amplitude data ZF and noise data ZS of the unmanned mine vehicle driving on the planned route are obtained. The vibration frequency data ZP represents a maximum vibration frequency of the unmanned mine vehicle driving on the planned route, the amplitude data ZF represents a maximum vibration amplitude of the unmanned mine vehicle driving on the planned route, and the noise data ZS represents a maximum noise decibel value of the unmanned mine vehicle driving on the planned route. The operation coefficient YX of the unmanned mine vehicle on the planned route is obtained through the formula as follows:

$$YX = \beta 1 \times ZP + \beta 2 \times ZF + \beta 3 \times ZS,$$

where $\beta 1$, $\beta 2$, and $\beta 3$ are the proportionality coefficients, and $\beta 1 > \beta 2 > \beta 3 > 1$.

an operating threshold YXmax is obtained from the storage device, the operating coefficient YX is compared with the operating threshold YXmax to obtain comparison results, and whether an operating status (i.e. the driving status) of the unmanned mine vehicle driving on the planned route meets the requirements is determined based on the comparison results. A step of the comparing the operating coefficient YX with the operating threshold YXmax includes: in response to the operating coefficient YX being less than the operating threshold YXmax, it is determined that the operating status of the unmanned mine vehicle driving on the planned route meets requirements. Or in response to the operating coefficient YX being greater than or equal to the operating threshold YXmax, it is determined that the operating status of the unmanned mine vehicle on the planned route fails to meet requirements. The preset size threshold is marked as CC, and a new size threshold CCn for updating the preset size threshold CC is obtained by using the formula as follows:

$$CCn = t1 \times CC,$$

where t1 is a proportional coefficient and $0.85 \leq t1 \leq 0.95$.

The new size threshold CCn is taken to replace a numerical value of the preset size threshold CC in the obstacle detection device. Through the operation monitoring device, the driving status of the unmanned mine vehicle on the planned route can be monitored and analyzed. By comprehensively analyzing and calculating various parameters of the travels of the unmanned mine vehicle on the planned route to obtain the operation coefficient, the operation coefficient is a numerical value that reflects the stability of the operation of the unmanned mine vehicle. Therefore, the necessity of adjusting the obstacle threshold can be analyzed through the value of the operation coefficient.

Embodiment 2

As shown in FIG. 2, a working method of the intelligent obstacle detection system for an unmanned mine vehicle includes steps as follows.

Step 1: route planning analysis is performed for the unmanned mine vehicle: the starting position and the target position of the unmanned mine vehicle are obtained, travel routes from the starting position and the target position are obtained, point cloud data of the travel routes are collected through detection terminals, and the point cloud data is generated.

Step 2: the obstacle in the planned route of the unmanned mine vehicle is detected and analyzed: the size of the obstacle is detected through the multiple millimeter radars disposed in the front of the unmanned mine vehicle in response to the obstacle having been detected, and the unmanned mine vehicle is controlled to avoid the obstacle in response to the size of the obstacle failing to meet requirements.

Step 3: the planned route of the unmanned mine vehicle is analyzed and managed: the unmanned mine vehicle with the starting position, which is the same as the target position, is marked as the management object, the travel processes of the management object on the planned route is marked as the management processes, the overlap coefficient and the deviation coefficient of the management processes are obtained, the overlap threshold and the deviation threshold of the management processes are obtained from the storage device to determine whether the planned route of the unmanned mine vehicle meets the requirements.

Step 4: the driving status of the unmanned mine vehicle on the planned route are monitored and analyzed: the vibration frequency data ZP, the amplitude data ZF and the noise data ZS of the unmanned mine vehicle driving on the planned route are obtained, the operation coefficient YX is obtained by the numerical calculation of the vibration frequency data ZP, the amplitude data ZF, and the noise data ZS, and whether the driving status of the unmanned mine vehicle on the planned route meets requirements is determined through the operating coefficient YX.

When the intelligent obstacle detection system for an unmanned mine vehicle is in the work, the starting position and the target position of the unmanned mine vehicle are obtained, followed by obtaining all travel routes from the starting position and the target position. The point cloud data of the travel routes are obtained through detection terminals, and followed by generating the point cloud data. Through the detecting the sizes of the obstacles by millimeter radars disposed in a front of the unmanned mine vehicle, the unmanned mine vehicle is controlled to avoid the obstacles when the sizes of the obstacles do not meet the requirements. The unmanned mine vehicle with a starting position, which is the same as the target position, is marked as a management object, travel processes of the management object on the planned route are marked as a management processes. The overlap coefficient and the deviation coefficient during the management processes are obtained to determining whether the overlap coefficient and the deviation coefficient meet the requirements. The vibration frequency data ZP, the amplitude data ZF and the noise data ZS of the unmanned mine vehicle driving on the planned route are obtained, the operation coefficient YX is obtained by the numerical calculation of the vibration frequency data ZP, the amplitude data ZF, and the noise data ZS, and whether the driving status of unmanned mine vehicle on the planned route meets the requirements through the operating coefficient YX is determined.

The above content is only embodiments and explanations of the structure of the disclosure. Those skilled in the art may make various modifications or supplements to the specific embodiments described, or use similar methods to replace them. As long as they do not deviate from the structure of the disclosure or exceed the scope defined in the disclosure, they should all fall within the scope of protection of the disclosure.

The above formulas are derived from extensive data collection through software simulation, and a formula close to the actual value is selected. The coefficients in the formulas are set by those skilled in the art according to the actual situation. For example, in the formula $GH=\alpha1\times ZA+\alpha2\times LC$, those skilled in the art collect multiple sets of sample data and set corresponding planning coefficients for each set. The set planning coefficients and collected sample data are substituted into the formula, and any three formulas constitute a system of three linear equations. The calculated coefficients are screened and averaged to obtain the values of $\alpha1$ and $\alpha2$ as 3.41 and 2.92, respectively.

The magnitude of the coefficients is to quantify each parameter into a specific numerical value for subsequent comparison. The magnitude of the coefficients depends on the amount of sample data and the initial planning coefficients set by those skilled in the art for each set of sample data. As long as it does not affect the proportional relationship between the parameters and the quantified numerical values, such as the planning coefficient being directly proportional to the distance value.

In the description of the disclosure, the reference to terms such as "one embodiment", "example" and "specific embodiment" means that the specific features, structures, materials, or features described in conjunction with the embodiment or example are included in at least one embodiment or example of the disclosure. In the disclosure, the illustrative expressions of the above terms may not necessarily refer to the same embodiments or examples. Moreover, the specific features, structures, materials, or features described can be combined in an appropriate manner in any one or more embodiments or examples.

The specific embodiments of the disclosure are only intended to assist in elucidating the disclosure. The specific embodiment does not provide a detailed description of all the details, nor does it limit the specific embodiment of the disclosure. Apparently, there are many modifications and changes that can be made based on the content of the disclosure. The disclosure selects and specifically describes these embodiments in order to better explain the principles and practical applications of the disclosure, so that those skilled in the art can better understand and utilize the disclosure. The disclosure is limited only by the claims and all their scope and equivalents.

What is claimed is:

1. An obstacle detection system for an unmanned mine vehicle comprising a processor a memory coupled to the processor, wherein the memory stores a computer program executable by the processor, the obstacle detecting system comprising:

a detection platform, a route planning device, an obstacle detection device, a planning management device, an operation monitoring device, and a storage device, wherein the route planning device, the obstacle detection device, the planning management device, the operation monitoring device, the storage device are individually communicatively connected with the detection platform, each of the route planning device, the obstacle detection device, the planning management device, and the operation monitoring device are embodied by the processor and the memory coupled to the processor, and the computer program executable by the processor;

wherein the route planning device is configured to perform route planning analysis for the unmanned mine vehicle to obtain a planned route of the unmanned mine vehicle, and send the planned route of the unmanned mine vehicle to the obstacle detection device through the detection platform;

wherein the obstacle detection device is configured to detect and analyze an obstacle in the planned route, specifically, the obstacle detection device is configured to:

control the unmanned mine vehicle to move along the planned route; perform, through a plurality of millimeter radars disposed in a front of the unmanned mine vehicle, a real-time obstacle analysis during the movement of the unmanned mine vehicle, to obtain a size of the obstacle in response to the obstacle having been detected and determine whether the size of the obstacle is smaller than a preset size threshold; and in response to the size of the obstacle being greater than or equal to the preset size threshold, control the unmanned mine vehicle to avoid the obstacle until the unmanned mine vehicle arrives a target position;

wherein the planning management device is configured to analyze and manage the planned route of the unmanned mine vehicle, specifically, the planning management device is configured to:

define the unmanned mine vehicle as a management object, where the unmanned mine vehicle is located at a starting position, and is assigned the target position; define travel processes of the management object on the planned route as management processes for managing the management object during travelling of the management object; obtain an overlap coefficient and a deviation coefficient of the management processes; obtain an overlap threshold and a deviation threshold of the management processes from the storage device; compare the overlap coefficient and the deviation coefficient with the overlap threshold and the deviation threshold respectively to obtain comparison results; and determine, based on the comparison results, whether the overlap coefficient is greater than the overlap threshold; and wherein the monitoring device is configured to:

obtain vibration frequency data ZP, amplitude data ZF and noise data ZS of the unmanned mine vehicle driving on the planned route, wherein the vibration frequency data ZP represents a maximum vibration frequency of the unmanned mine vehicle driving on the planned route, the amplitude data ZF represents a maximum vibration amplitude of the unmanned mine vehicle driving on the planned route, the noise data ZS represents a maximum noise decibel value of the unmanned mine vehicle driving on the planned route;

obtain an operation coefficient YX of the unmanned mine vehicle driving on the planned route, by numerical calculation of the vibration frequency data ZP, the amplitude data ZF, and the noise data ZS;

obtain an operating threshold YXmax from the storage device;

compare the operating coefficient YX with the operating threshold YXmax; and in response to the operating coefficient YX being greater than or equal to the operating threshold YXmax, define the preset size threshold as CC, and obtain a new size threshold CCn for updating the preset size threshold CC by using the formula as follows:

$$CCn = t1 \times CC,$$

where t1 represents a proportional coefficient and $0.85 \leq t1 \leq 0.95$.

2. The obstacle detection system for an unmanned mine vehicle as claimed in claim 1, wherein the route planning device is specifically configured to:

obtain the starting position and the target position of the unmanned mine vehicle, obtain travel routes from the starting position to the target position, collect point cloud data of the travel routes from detection terminals comprising lidars and cameras, perform algorithmic analysis on the point cloud data to determine a number of obstacles on each of the travel routes and define the number of obstacles as ZA, define a length of each of the travel routes as a distance value LC, calculate a planning coefficient GH of each of the travel routes by a numerical computation of ZA and LC; and define a corresponding one of the travel routes with a smallest GH as the planned route.

3. The obstacle detection system for an unmanned mine vehicle as claimed in claim 1, wherein the planning management device is further configured to:

obtain an overlap degree between each of the travel routes of the management object during the management processes and the planned route to thereby obtain overlap degrees of the management processes, and define the overlap degrees as overlap values of the management processes;

sum up the overlap values of the management processes and taking an average to get the overlap coefficient, establish an overlap set based on the overlap values of the management processes, and calculate a variance of the overlap set to obtain the deviation coefficient.

4. The obstacle detection system for an unmanned mine vehicle as claimed in claim 3, wherein the planning management device is further configured to:

in response to the overlap coefficient being greater than the overlap threshold send a planning qualification signal to the detection platform, to make the detection platform send the planning qualification signal to a mobile terminal of a management personnel upon receiving the planning qualification signal; or in response to the overlap coefficient being less than or equal to the overlap threshold and the deviation coefficient being greater than the deviation threshold, send a road condition management signal to the detection platform, to make the detection platform send the road condition management signal to the mobile terminal of the management personnel upon receiving the road condition management signal; or in response to the overlap coefficient being less than or equal to the overlap threshold and the deviation coefficient being less than or equal to the deviation threshold, a point cloud optimization signal to the detection platform, to make the detection platform send the point cloud optimization signal to the mobile terminal of the management personnel upon receiving the point cloud optimization signal.

5. An obstacle detection system for an unmanned mine vehicle comprising a processor a memory coupled to the processor, wherein the memory stores a computer program executable by the processor, the obstacle detecting system comprising:

a detection platform, a route planning device, an obstacle detection device, a planning management device, an operation monitoring device, and a storage device, wherein the route planning device, the obstacle detection device, the planning management device, the operation monitoring device, the storage device are individually communicatively connected with the detection platform, each of the route planning device, the obstacle detection device, the planning management device, and the operation monitoring device are embodied by the processor and the memory coupled to the processor, and the computer program executable by the processor;

wherein the route planning device is configured to perform route planning analysis for the unmanned mine vehicle to obtain a planned route of the unmanned mine vehicle, and send the planned route of the unmanned mine vehicle to the obstacle detection device through the detection platform;

wherein the obstacle detection device is configured to detect and analyze an obstacle in the planned route, specifically, the obstacle detection device is configured to:

control the unmanned mine vehicle to move along the planned route; perform, through a plurality of millimeter radars disposed in a front of the unmanned mine vehicle, a real-time obstacle analysis during the movement of the unmanned mine vehicle, to obtain a size of the obstacle in response to the obstacle having been detected and determine whether the size of the obstacle is smaller than a preset size threshold; and in response to the size of the obstacle being greater than or equal to the preset size threshold, control the unmanned mine vehicle to avoid the obstacle until the unmanned mine vehicle arrives a target position;

wherein the planning management device is configured to analyze and manage the planned route of the unmanned mine vehicle, specifically, the planning management device is configured to:

define the unmanned mine vehicle as a management object, where the unmanned mine vehicle is located at a starting position and is assigned the target position;

define travel processes of the management object on the planned route as management processes for managing the management object during travelling of the management object;

obtain an overlap degree between each of the travel routes of the management object during the management processes and the planned route to thereby obtain overlap degrees of the management processes; define the overlap degrees as overlap values of the management processes; sum up the overlap values of the management processes and taking an average to get an overlap coefficient; establish an overlap set based on the overlap values of the management processes; and calculate a variance of the overlap set to obtain a deviation coefficient;

in response to the overlap coefficient being greater than an overlap threshold, send a planning qualification signal to the detection platform, to make the detection platform send the planning qualification signal to a mobile terminal of a management personnel upon receiving the planning qualification signal; or in response to the overlap coefficient being less than or equal to the overlap threshold and the deviation coefficient being greater than the deviation threshold, send a road condition management signal to the detection platform, to make the detection platform send the road condition management signal to the mobile terminal of the management personnel upon receiving the road condition management signal; or in response to the overlap coefficient being less than or equal to the overlap threshold and the deviation coefficient being less than or equal to the deviation threshold, send a point cloud optimization signal to the detection platform, to make the detection platform send the point cloud optimization signal to the mobile terminal of the management personnel upon receiving the point cloud optimization signal; and wherein the operation monitoring device is configured to monitor and analyze a driving status of the unmanned mine vehicle on the planned route.

* * * * *